[15] 3,636,389

Petrick [45] Jan. 18, 1972

[54] MAGNETOHYDRODYNAMIC METHOD AND SYSTEM

[72] Inventor: Michael Petrick, Joliet, Ill.

[73] Assignee: The United States of America as represented by the United States Atomic Energy Commission

[22] Filed: Mar. 22, 1971

[21] Appl. No.: 126,711

[52] U.S. Cl. ............................................................310/11
[51] Int. Cl. ................................................................H02m 4/02
[58] Field of Search .................................310/10, 11; 60/202

[56] References Cited

UNITED STATES PATENTS 3,099,131    7/1963    Rosa ......................................310/11 X
3,432,694    3/1969    Bidard ......................................310/11

Primary Examiner—D. X. Sliney
Attorney—Roland A. Anderson

[57] ABSTRACT

A magnetohydrodynamic (MHD) power plant containing a plurality of MHD generators arranged in a number of stages operates on a two-phase working fluid consisting of an inert gas dispersed in an electrically conductive liquid. Heat is added to the working fluid by reconstituting the working fluid with conductive liquid heated to the original temperature between stages. All stages are operated essentially isothermally, the last MHD generator being operated under conditions such that vapors of the conductive liquid present in the working fluid are condensed therein. The gas phase from the last MHD generator is cooled by regenerative heat exchange and recompressed prior to being returned to the heat source. Also, each MHD generator is surrounded by a separate magnetic field which is separately adjustable to minimize the velocity difference between phases as the working fluid passes through the MHD generator.

5 Claims, 1 Drawing Figure

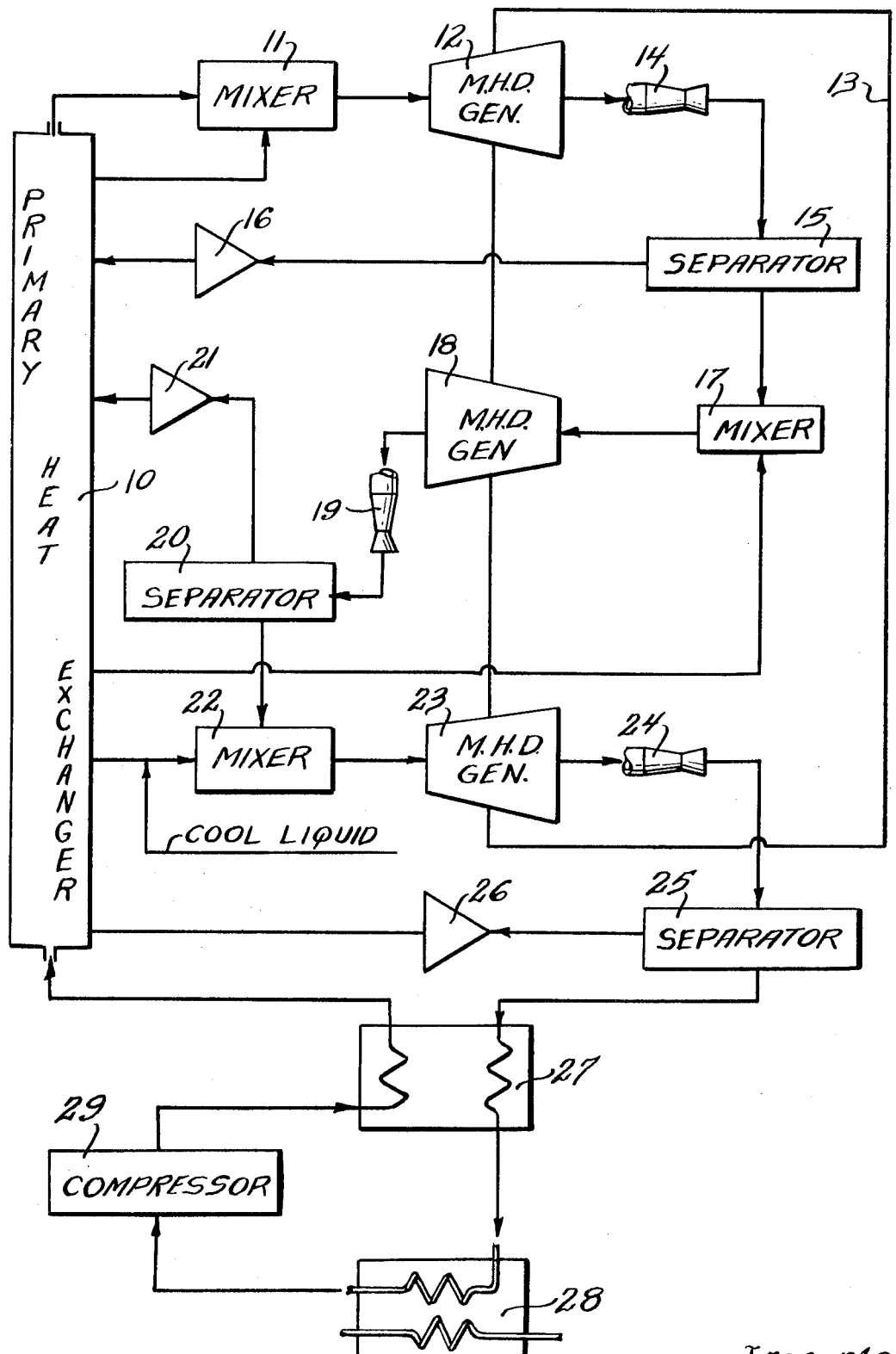

3,636,389

MAGNETOHYDRODYNAMIC METHOD AND SYSTEM

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to an improved method and apparatus for converting thermal energy to electrical energy along a thermodynamic cycle including a plurality of magnetohydrodynamic (MHD) systems. In more detail the invention relates to an improved method of generating electrical power employing a two-phase fluid consisting of a dispersion of an inert gas in an electrically conductive liquid as working fluid in an MHD power-generation system. In still more detail the invention relates to such a method in which the temperature of the working fluid is maintained nearly constant through most of the system while the gas pressure decreases in succeeding MHD stages.

Since it was first recognized that an MHD generator could successfully operate with a two-phase conductive-liquid gaseous working fluid, several power cycles utilizing such a generator have been proposed and studied. Sufficient experimental and analytical data have been developed on various key components such as the two-phase flow MHD generator to verify the feasibility of such cycles. For example, two-phase-flow liquid-metal generators can be coupled to either liquid-metal or gas-cooled reactors and operated in either single-stage or multistage Rankine or Brayton-type cycles with one or two component working fluids. The cycles could also be coupled to a fossil-fired heat source.

Such cycles are of great interest since there is a major gap in energy conversion technology in the temperature range of 1,100°–2,000° F. which is where such cycles operate effectively. No technology exists today which can be used on a commercial scale to efficiently extract electrical energy from a working fluid at these temperatures, yet major R&D programs now under way can confidently be expected to lead to the development of large commercial heat sources within this temperature range. Initially the maximum temperature of the liquid-metal-cooled fast-breeder reactor will be 1,200° F. but its evolution can be expected to proceed to higher temperatures. A number of commercial prototype advanced high-temperature ($\approx$1,400° F.) gas-cooled reactors are already under construction. Also, as currently envisaged the major fraction of thermal energy released in a fusion reactor ($\approx$80 percent) will be transferred to a liquid-metal coolant whose maximum temperature will be 2,000° F.

SUMMARY OF THE INVENTION

According to the present invention a multistage MHD generating system is operated employing a two-phase working fluid with the gas phase continuing at gradually decreasing pressure through the entire system and with heat being added in each stage except the last by mixing the gas phase from the preceding stage with liquid phase heated to the original temperature of the first stage.

In more detail according to the present invention a two-phase working fluid consisting of a dispersion of an inert gas in an electrically conducted liquid is expanded to a predetermined pressure in a MHD generator operating essentially isothermally as electric energy is extracted, the phases are separated and the working fluid reconstituted with conductive liquid heated to the original temperature in the system. The new working fluid, which has essentially the same temperature but is at a lower pressure than the original working fluid is expanded in a MHD generator operated essentially isothermally as electric energy is extracted. The system may include any desired number of stages and the final stage is operated at a temperature such that the vapor pressure of the electrically conductive liquid is negligible so that essentially all of the vapor of the conductive liquid which is present in the working fluid is condensed therein. The gas phase from the last stage MHD generator is cooled in a regenerative heat exchanger and recompressed.

BRIEF DESCRIPTION OF THE DRAWING

The invention will next be described in connection with the accompanying drawing wherein the single figure is a block diagram of a system for converting thermal energy to electric energy employing magnetohydrodynamic generators.

DESCRIPTION OF THE PREFERRED EMBODIMENT

As shown in the drawing a conducting liquid such as lithium and an inert gas such as helium are separately heated in heat source 10 to a temperature between 1,200° and 2,000° F.—which may be a liquid-metal-cooled nuclear reactor—and the heated gas and liquid metal are mixed in mixer 11 to disperse the gas in the liquid metal and form a two-phase working fluid. This two-phase working fluid is expanded in MHD generator 12 under conditions such that there is little (less than 20° F.) temperature change therein. This is accomplished by employing a working fluid employing a high ratio of liquid to gas and limiting the mass flow rate ratio to the extent necessary to maintain a liquid continuum and hence adequate electrical conductivity. As the gas expands it absorbs heat from the liquid. Thus the overall effect is a substantial reduction in gas pressure and only a slight reduction in temperature of the gas. Since the temperature of the gas is not reduced very much, there is no condensation of liquid metal vapors. Electric energy is extracted from MHD generator 12—and all MHD generators—by lines 13.

The two-phase working fluid discharged from the MHD generator is expanded in nozzle 14—which physically forms a part of the MHD generator—to gain sufficient kinetic energy in the liquid phase so that it can pass back to the heat source 10 through a diffuser. The working fluid is then directed into a separator 15 wherein separation of liquid and gas phases takes place. This is accomplished by impinging the two-phase working fluid on a flat surface. The liquid phase returns to heat source 10 through diffuser 16 where kinetic energy is transformed to pressure and the gas phase passes to a mixer 17 where it is mixed with conductive liquid which has been heated to the original temperature in heat source 10. The resulting two-phase working fluid passes into a second-stage MHD generator 18 which is again operated essentially isothermally and where electric energy is extracted. As before the working fluid passes from MHD generator 18 through nozzle 19 to separator 20. Also as before the liquid phase from separator 20 returns to heat source 10 through diffuser 21. The two-phase working fluid may be passed through as many such stages as is desirable to attain maximum efficiency. By bringing the liquid in each stage to the top temperature in the system while permitting the gas pressure to be reduced maximum efficiency of the system is attained.

In the final stage the gas phase from separator 20 is mixed in mixer 22 with conductive liquid which is not heated to the original temperature although conductive liquid from heat source 10 may be used to adjust the temperature of the working fluid to the desired value. This temperature is adjusted such that the vapor pressure of the conductive liquid is negligible as the working fluid is expanded in MHD generator 23 so that essentially all of the vapor of the conductive liquid is condensed therein. Then the working fluid passes from MHD generator 23 through nozzle 24 to separator 25 and the liquid phase from separator 25 returns to heat source 10 through diffuser 26. Since MHD generator 23 is the last generator in the series, the gas phase from separator 25 passes through regenerative heat exchanger 27 and reject heat exchanger 28 to compressor 29. The compressed gas passes through regenerative heat exchanger 27 countercurrent to the gas from separator 25 and is returned to heat source 10. It is essential that MHD generator 23 be operated so that vapor of the conductive liquid present in the working fluid condenses therein since the presence of these vapors in regenerative heat exchanger 27 would decrease performance of the heat exchanger and thus decrease the efficiency of the whole cycle.

It will be observed that the working fluid in each stage is at approximately the same temperature—the top temperature of the system—although the gas pressure drops from stage to stage. Since the temperature of the working fluid is uniformly high until MHD generator 23 is reached, efficiency of the thermodynamic cycle is high and vapor of the working fluid will not condense until this time.

It is theoretically postulated that a MHD device can be operated as a compressor as well as an electric generator. In the case of a generator electrical power is taken out and in the case of a compressor electrical power is put in. It will be appreciated therefor that the cycle described above could also be applied to a multistage system for compressing a gas in which each stage is operated isothermally and the working fluid is reconstituted after each stage with conductive liquid cooled to the original temperature in the system.

It will be appreciated that the constituents of the working fluid may be different from those specified and in fact nearly any alkali metal and inert gas can be used.

It will be understood that the invention is not to be limited to the details given herein but that it may be modified within the scope of the appended claims.

The embodiments of the invention in which an exclusive property or privilege is claimed are defined as follows:

1. A method of converting thermal energy to electrical energy comprising heating an inert gas and an electrically conductive liquid, mixing said inert gas and conductive liquid to form a two-phase working fluid, expanding said two-phase fluid in a magnetohydrodynamic (MHD) generator operated essentially isothermally to generate an electric current, separating the phases and reconstituting the two-phase working fluid by mixing conductive liquid heated to the original temperature with the gas phase, repeating said isothermal expansions with reconstituted working fluid in a MHD generator to generate an electric current, separating the phases, cooling the gas phase by regenerative heat exchange and compressing the gas.

2. The method of claim 1 wherein a separate magnetic field surrounds each MHD generator and the magnetic fields are separately adjusted to minimize the velocity difference between the gas and liquid phases.

3. A method of converting thermal energy to electrical energy comprising heating an electrical conductive liquid and gas, expanding the two-phase fluid thus formed essentially isothermally in a magnetohydrodynamic (MHD) generator to generate an electric current, converting the thermal energy of the two-phase fluid departing the MHD generator to kinetic energy, separating the gas phase from the liquid phase, converting the kinetic energy of the liquid phase to pressure head and returning it to the heat source, mixing the gas phase from said separator with heated conductive liquid, expanding the two-phase fluid thus formed essentially isothermally in a MHD generator to generate an electric current, converting the thermal energy of the two-phase fluid departing the MHD generator to kinetic energy separating the gas phase from the liquid phase, converting the kinetic energy of the liquid phase to pressure head and returning it to the heat source, mixing the gas phase from said separator with conductive liquid condense, expanding the two-phase fluid thus formed isothermally in a MHD generator to generate an electric current, converting the thermal energy of the fluid departing the MHD generator to kinetic energy, separating the liquid phase from the gas phase, converting the kinetic energy of the condensed phase to pressure head and returning it to the heat source, and cooling by regenerative heat exchange the gas phase, compressing the gas and returning it to the heat source.

4. The method of claim 3 wherein a separate magnetic field surrounds each MHD generator and separately adjusting said magnetic fields dependent on the pressure and temperature of the two-phase working fluid to minimize the relative velocity between phases.

5. Apparatus for the production of electric energy comprising a heat source for heating a conductive liquid and an inert gas, means for mixing said conductive liquid and inert gas to form a two-phase working fluid, means for directing said working fluid into the first stage of a multistage magnetohydrodynamic (MHD) generating system, a nozzle downstream of each of the MHD generators through which said working fluid is exhausted from said generator, means downstream of each of the nozzles for separating the phases of the two-phase working fluid, means for returning the liquid phase to the heat source including a diffuser for converting the kinetic energy of the liquid phase to pressure head, means for mixing the gas phase with conductive liquid heated to the original temperature, means for directing the thus reconstituted two-phase working fluid into the next MHD generator in the series, and means for cooling and recompressing the gas phase from the last stage prior to returning it to the heat source including a regenerative heat exchanger, all stages being operated essentially isothermally, the last stage being operated at all temperature such that the vapor pressure of the conductive liquid is negligible therein.

* * * * *

UNITED STATES PATENT OFFICE
CERTIFICATE OF CORRECTION

Patent No. 3,636,389          Dated January 18, 1972

Inventor(s) Michael Petrick

It is certified that error appears in the above-identified patent and that said Letters Patent are hereby corrected as shown below:

Column 1, line 50, after "be" insert -- $\leq$ --.

Column 3, line 38, after "current" insert --one or more times, expanding reconstituted working fluid having a temperature such that vapors of the conductive liquid condense isothermally in a MHD generator to generate an electric current--.

line 46, change "electrical" to --electrically--.

line 47, after "gas," insert --mixing said conductive liquid and gas,--.

Column 4, line 13, after "liquid" insert --having a temperature such that vapors of the conductive liquid--.

line 46, change "all" to --a--.

Signed and sealed this 4th day of July 1972.

(SEAL)
Attest:

EDWARD M. FLETCHER, JR.
Attesting Officer

ROBERT GOTTSCHALK
Commissioner of Patents